United States Patent [19]

Bowman et al.

[11] 4,290,623
[45] Sep. 22, 1981

[54] COVER FOR A TRACTOR'S ARTICULATION SPACE

[75] Inventors: George E. Bowman, Country Club Hills; David S. Faust, Bolingbrook; David T. Kataoka, Berwyn, all of Ill.

[73] Assignee: International Harvester Company, Chicago, Ill.

[21] Appl. No.: 114,434

[22] Filed: Jan. 22, 1980

[51] Int. Cl.³ .............................................. B62D 53/02
[52] U.S. Cl. ...................... 280/400; 105/18; 180/14 R; 280/403; 280/442
[58] Field of Search ................ 280/403, 420, 400, 426, 280/442; 180/11, 12, 14 R, 134, 136, 139; 296/1 S; 105/10, 15, 18

[56] References Cited

U.S. PATENT DOCUMENTS

| | | | |
|---|---|---|---|
| 2,193,156 | 3/1940 | Antoine | 280/403 |
| 2,407,007 | 9/1946 | Henrichsen | 180/139 |
| 2,843,417 | 7/1958 | Wahl et al. | 280/403 |
| 3,137,514 | 6/1964 | Wahl | 280/403 |
| 3,446,175 | 5/1969 | Boehler et al. | 180/12 |
| 3,995,569 | 12/1976 | Picardat | 180/11 |

Primary Examiner—Joseph F. Peters, Jr.
Assistant Examiner—Donn Mc Giehan
Attorney, Agent, or Firm—Douglas W. Rudy; Ronald C. Kamp; F. David AuBuchon

[57] ABSTRACT

An articulated tractor that has its front and rear sections pivotally connected along the tractor's axis of articulation. The lead surface of the rear section and the trailing surface of the front section form an articulation space which is in close proximity to the articulation axis. To improve this arrangement, a cover is provided which substantially encompasses the articulation space with an enclosure. The enclosure incorporates at least two flexible bellows, which are opaque between their forward, rearward, top and bottom edges. The enclosure also includes four bands, a plurality of elements rigidly securing one of the bands to each of the forward and rearward edges of the bellows, and a plurality of members rigidly secured to the bands. The cover also utilizes a support to pivotally support the enclosure. This support is rigidly secured to either the front or the rear section of the tractor. The enclosure is pivotally supported by the support through a mechanism that utilizes a pair of main pivotal connections near the articulation axis to connect a mechanism to the support, and two corresponding pairs of secondary pivotal connections to connect the enclosure to the mechanism. The cover further utilizes at least two stiffeners which are pivotally connected to the mechanism to flexibly reinforce each of the bellows. Lastly, the cover utilizes a plurality of retainers which are rigidly secured to the lead and trailing edges of the sections of the tractor. These retainers are resiliently and slideably connected to the members of the enclosure.

5 Claims, 5 Drawing Figures

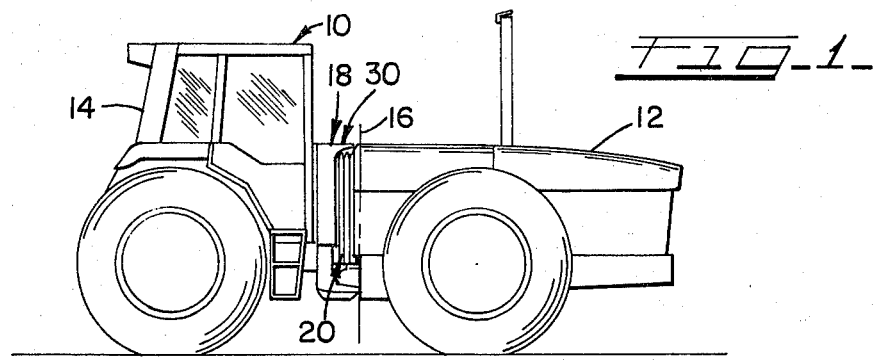
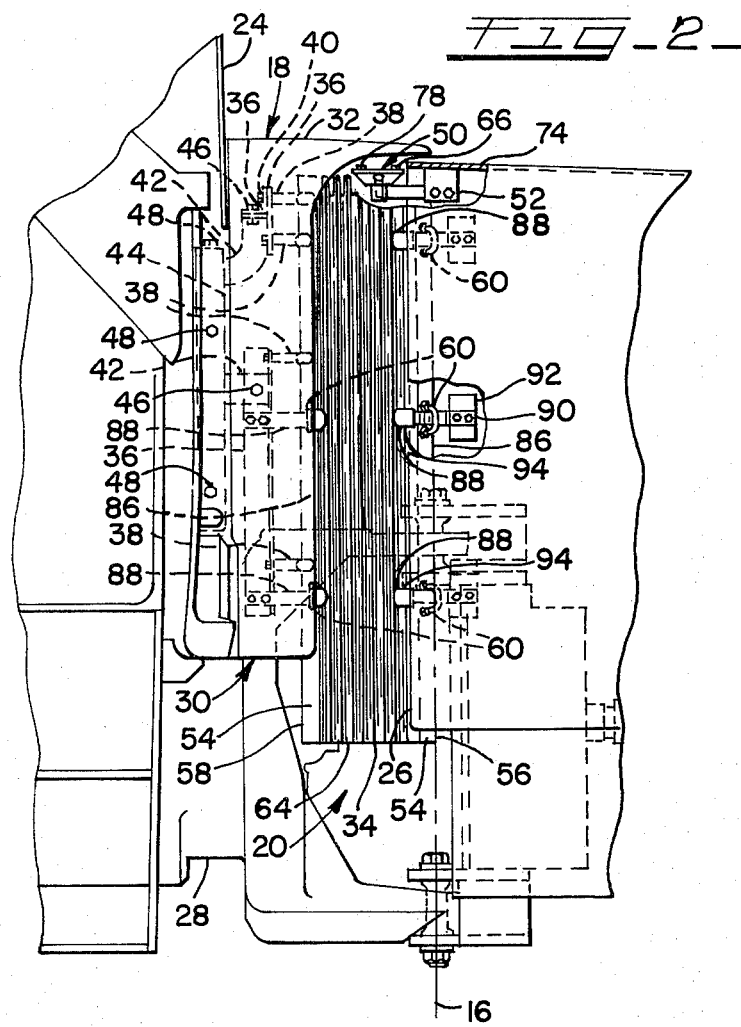

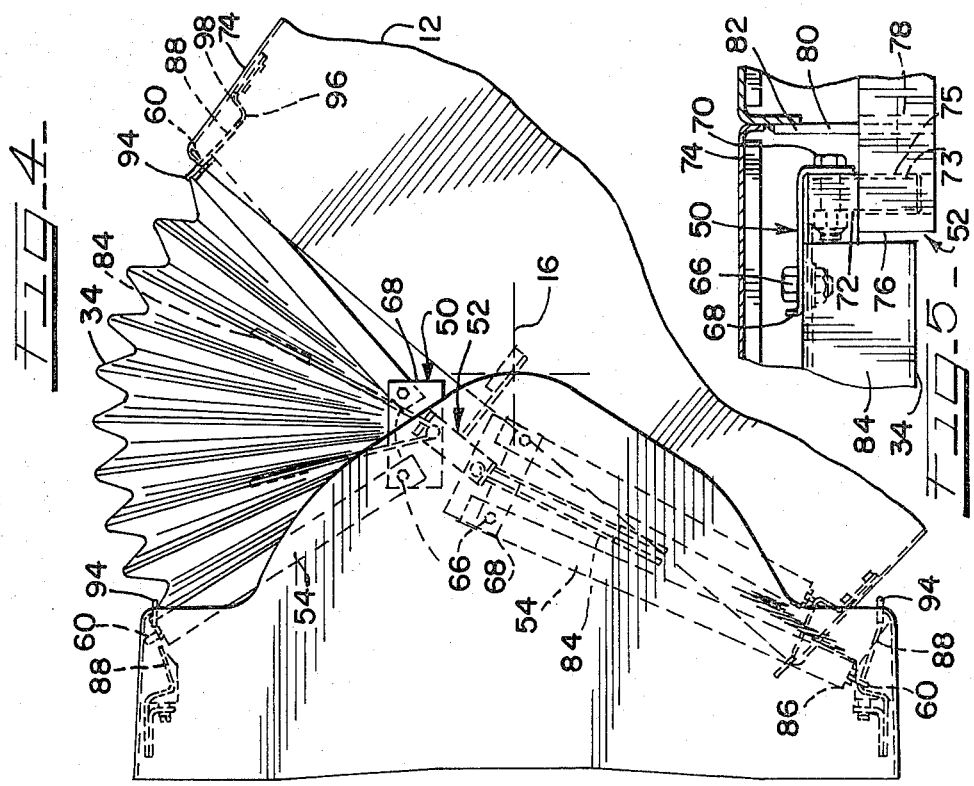
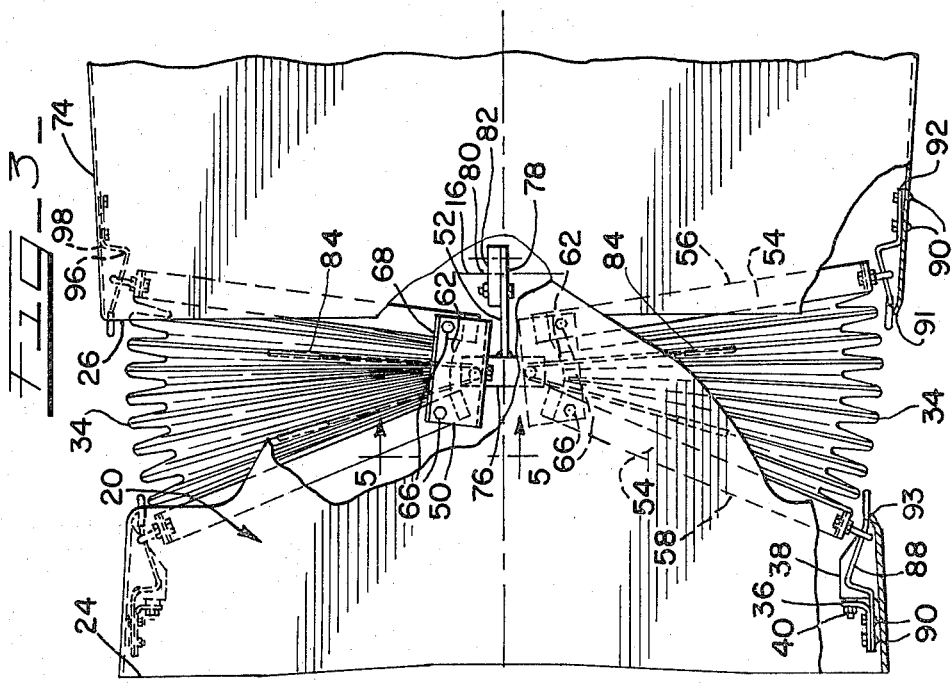

COVER FOR A TRACTOR'S ARTICULATION SPACE

BACKGROUND OF THE INVENTION

This invention relates generally to articulated tractors, and more particularly concerns a cover for the space between the front and rear sections of an articulated tractor.

With the recent trend toward the design and use of articulated tractors to increase the tractor's tractive power without sacrificing its maneuverability, the articulated tractors have been modified for use on farms which produce row crops such as corn, soy beans, and sun flowers. The expanded use of articulated tractors has brought to light the desirability of providing a cover for the space between the front and rear sections of the tractor.

This articulation space is in close proximity to the tractor's axis of articulation and would contain at least a portion of the tractor's steering mechanism, hydraulics and power train. A cover for the articulation space would protect these tractor components from the caustic environment in which the tractor must operate. In addition, the cover would greatly improve the appearance of the tractor by acting as a transitional element between the tractors front and rear sections.

An articulation space cover must meet, however, three criteria before these benefits can be enjoyed by the tractor manufacturer and the tractor user. The first criteria for the tractor is that it must survive the extreme range of motion present at the articulation axis, when the tractor sections are rotated through their full range of turning positions. For example, in a row crop articulated tractor, an arc of 80° can be traversed by the rear section with respect to the front section, when the tractor is swung from a full right turn to a full left turn. This large angular travel will require a cover capable of surviving an angular range of motion of 40° in both directions from its normal straight ahead position.

In addition to the extreme flexibility criterion, the cover must also be easily detachable to allow access to the tractor components that are located within or adjacent to the articulation space. If the cover is not readily detachable, the maintenance and servicing of the components will require an increased amount of time, thereby decreasing the efficiency of the tractor by increasing its downtime during planting, cultivating and harvesting seasons.

The final criterion for the articulation space cover is that the structure which satisfies the first criteria must remain uncomplicated. If the cover has a complicated structure, the tractors maintenance and servicing requirement will be increased, which will again decrease the efficiency of the tractor by increasing the tractors downtime during critical operating seasons. A complicated structure will also unnecessarily increase the cost of the cover to both the manufacturer and the tractor user, thereby making them unwilling to enjoy the benefits offered by the cover.

Accordingly, it is an object of the present invention to provide a cover for the articulation space of an articulated tractor.

Moreover, it is an object of the present invention to provide an articulation space cover that will survive the extreme range of motion present in the articulation space of the tractor.

With more particularity, it is an object of the present invention to provide a tractor with dependable articulation space cover that is also quickly detachable to minimize the cover's interference with the maintenance and servicing of the tractor's components located in and adjacent the articulation space.

Finally, it is an object of the present invention to provide a quickly detachable, dependable articulation space cover that has a simplified structure to minimize the cost, maintenance, and servicing requirements of the cover.

SUMMARY OF THE INVENTION

An articulated tractor that has its front and rear sections pivotally connected along the tractors axis of articulation. The lead surface of the rear section and the trailing surface of the front section form an articulation space which is in close proximity to the articulation axis. To improve this arrangement, a cover is provided which substantially encompasses the articulation space with an enclosure. The enclosure incorporates at least two flexible bellows, which are opaque between their forward, rearward, top and bottom edges. The enclosure also includes four bands, a plurality of elements rigidly securing one of the bands to each of the forward and rearward edges of the bellows and a plurality of members rigidly secured to the bands. The cover also utilizes a support to pivotally support the enclosure. This support is rigidly secured to either the front or the rear section of the tractor. The enclosure is pivotally supported by the support through a mechanism that utilizes a pair of main pivotal connections near the articulation axis to connect a mechanism to the support, and two corresponding pairs of secondary pivotal connections to connect the enclosure to the mechanism. The cover further utilizes at least two stiffeners which are pivotally connected to the mechanism to flexibly reinforce each of the bellows. Lastly, the cover utilizes a plurality of retainers which are rigidly secured to the lead and trailing edges of the sections of the tractor. These retainers are resiliently and slideably connected to the members of the enclosure.

BRIEF DESCRIPTION OF THE DRAWINGS

Other objects and advantages of the invention will become apparent upon reading the following detailed description and upon reference to the drawings, in which:

FIG. 1 is a right side view of an articulated tractor incorporating the present invention;

FIG. 2 is an enlarged right side view of the articulation space of the articulated tractor of FIG. 1;

FIG. 3 is an enlarged top view of the articulation space of the articulated tractor of FIG. 1 when the tractor is in the straight ahead mode;

FIG. 4 is an enlarged top view of the articulation space of the articulated tractor of FIG. 1 when the tractor is in the full right turn mode; and FIG. 5 is a view along line 5—5 of FIG. 3.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIG. 1 there is shown an articulated tractor 10. The tractor 10 has its front section 12 and rear section 14 pivotally connected along the tractors axis of articulation 16. The tractor 10 also incorporates a cover 18 which substantially encompasses the articulation space 20 with an opaque enclosure 30.

The articulation space 20 and the cover 18 of the preferred embodiment are shown in detail in FIGS. 2, 3 and 5. By referring to FIGS. 2 and 3, the articulation space 20 is established as the space between the leading surface 24 of the rear section 14 and the trailing surface 26 of the front section 12. FIG. 2 shows the articulation space 20 to include the lower portion of the axis of articulation 16.

It will be understood, that the articulation space 20 will also contain or be adjacent to components of the steering mechanism (not shown), hydraulics (not shown) and the drive train 28 of the tractor 10 which pass through the articulation space 20. The elements of the drive train 28 are fully disclosed in co-owned, copending patent application invented by Mr. Anthony M. Kestian and Mr. Raymond J. Allori, entitled "Articulated Tractor Power Train" Ser. No. 114,177, which was filed on the same day as this application. This copending application is hereby incorporated by reference to provide a complete disclosure of the power train of the tractor 10.

In the preferred embodiment, the cover 18 envelopes the articulation space 20 in an enclosure 30. The enclosure 30 includes a cowl 32 and a pair of bellows 34. The cowl is a rigid structure made from an opaque fiberglass type material, while the bellows are a flexible pleated structure made from an opaque rubber type material. The arrangement of the cowl 32 and the bellows 34 in the preferred embodiment, as shown in FIGS. 2, 3, and 4, provides an opaque envelopment of the articulation space 20 of the tractor 10.

The cowl 32 is rigidly secured to the rear section 24 by a plurality of brackets 36 that are fastened to the cowls threaded internal bosses 38 by bolts 40. The brackets 36 are then secured to the ears 42 of the main brace 44 by a plurality of nuts and bolts 46. The main brace is then secured to the rear section 14 by another group of bolts 48.

Unlike the cowls rigid connection to the rear section 14, the bellows 34 are pivotally connected by a mechanism 50 to a support 52 which is rigidly connected to the front section 12. In the preferred embodiment, each of the bellows utilizes two spring steel bands 54. Each band is secured to the inside of the bellows 34 along the forward edge 56 and rearward edge 58 of the bellows by a plurality of U-bolt members 60 and nut elements 61, in the illustrated embodiment. The bands 54 extend the full length of the forward 56 and rearward 58 edges, and terminate beyond the top edge 62 and at the bottom edge 64 of the bellows 34.

As illustrated in FIGS. 2, 3 and 5, each of the bellows 34 and bands 54 are pivotally connected to one of a pair of plates 68 of the pivot mechanism 50 at two secondary nut and bolt pivotal connections 66. Each plate 68 is also rigidly connected by nuts and bolts 70 to a primary stud 72. The stud 72 bearingly and pivotally engages the support 52 in the bushing 73 which slidably engages the bushing operation 75 of the support 52. The support 52 is rigidly secured to the hood 74 of the front section 12.

In the preferred embodiment, the rigid connection of the support 52 to the hood 74 is achieved by welding a pivot block 76 to an arm 78. The arm 78 is secured by a pair of nuts and bolts 80 to a bar 82 that is welded to the hood 74.

In keeping with the present invention, a V-shaped stiffener 84 partially encircles the primary pivot stud 72. The illustrated stiffener 84 is a strip of form spring steel that contacts the inside surface of the bellows 34. The stiffeners 84 counteract the forces of gravity acting on the bellows without inhibiting the bellows pivotal flexibility.

The preferred embodiments bands 54 and bellows 34 are further connected to the front 12 and rear 14 sections of the tractor along their vertical portions 86. The illustrated structure utilizes a plurality of spring steel retainers 88, rigidly secured to both the front 12 and rear 14 sections, to connect the U-bolt members 60 to the front 12 and rear 14 sections. This arrangement provides slidable and flexible connections, which can be easily connected and disconnected by the tractor operator when he must obtain access to the tractor components within and adjacent to the articulation space.

As shown in FIGS. 2 and 3, the retainers 88 are rigidly secured to the rear section 14 by rivets 90 which attach the retainers to the brackets 36. Similarly, rivets 90 secure the retainers 88 to spacers 92 which are spot welded to the hood 74 of the front section 12. When the bellows 34 are pivotally connected to front section via the pivotal mechanism 50 and the support 52, the operator need only pass the rubber coated ends 94 of the retainers 88 through the U-bolt member 60 while moving the U-bolt member 60 beyond the flanges 91 and 93 of the front and rear sections to achieve a slideable and flexible connection between the bellows and bands vertical portions 86 and the front 12 and rear 14 sections of the tractor 10.

The interaction of the slidable and flexible connection, the resilient bands 54, and the compound pivoting produced by the pivotal mechanism 50 and the support 52 can best be explained by examining the changes in the respective positions of the components of the cover from FIG. 3 to FIG. 4. FIG. 3 shows the front and rear sections of the tractor when the tractor is being driven in a straight line, while FIG. 4 shows the same sections when the tractor is being driven in a full right hand turn direction.

As these figures show, the contact between the members 60 and the retainers 88 will vary along the entire length of the retainers from the rubber ends 94 to the first bend 96 of the retainers. In addition, the retainers will elastically deflect above the first bend 96 and the second bend 98 (see top right hand retainer in both figures). A further study of these figures shows that the rearward edges 58 of the bellows 34 and the rearward bands 54 will elastically deflect radially from their secondary pivotal connection 66. This elastic deflection occurs when they are on the side of the tractor towards which the tractor is being turned (see bottom left band in both figures). This deflection compensates for the geometry of the arrangement which inhibits the elastic deflection of the retainers 88 that are connected to these particular bands.

Continued examination of FIGS. 3 and 4 will show that the present invention provides a complex motion for the secondary pivotal connection 66 of the bellows 34 and bands 54. This complex motion increases their useful life by minimizing the arcuate and radial stresses of the bellows 34 and the bands 54. The minimization of these stresses is achieved through the geometry produced interaction of the hood 74, the support 52 and the mechanism 50. The hood 74 and support 52 with its primary pivot 72 pivot about the axis of articulation 16 as the tractor is being turned. The plates 68 with their secondary pivots 66 rotate about the moving primary pivots 72. The motion of the plates 68 is caused by the loading of the bellows 34 and bands 54 produced during the turn. By moving in response to turning loads, the plates 68 allows the secondary pivots 66 to assume the position that will minimize the stresses on the bellows 34 and the bands 54 produced during the extreme angular deflection of these elements during a full right hand or left hand turn will an articulation of 38.75° in either direction.

Thus it is apparent that there has been provided, in accordance with the invention, a cover for the articulation space of an articulated tractor that will survive the extreme turning range of the tractor, while being quickly detachable to minimize the cover's interference with the maintenance and servicing of the tractors components located within and adjacent to the articulation space. In addition, the cover has a simplified structure which minimizes the cover's cost, maintenance and servicing requirements. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. In an articulated tractor having front and rear sections pivotally connected on the articulation axis of said tractor, said articulation axis being in close proximity to the articulation space defined as the space between the trailing surface of said front section and the leading surface of said rear section, improvement including, in combination:

an enclosure substantially enclosing said articulation space, said enclosure including at least two flexible bellows defining an opaque area between the forward, rearward, top and bottom edges of each of said bellows, at least four bands, a plurality of elements rigidly securing one of said bands to each of said forward and rearward edges and a plurality of members rigidly secured to said bands;

a support rigidly secured to one of said front and rear sections to pivotally support said enclosure;

a mechanism pivotally connecting said enclosure and said support, said mechanism including a pair of primary pivotal connections between said mechanism and said support, and two corresponding pairs of secondary pivotal connections between said mechanism and said enclosure;

a plurality of retainers rigidly secured to said leading and trailing surfaces, said retainer being resiliently and slidably connected to said members; and at least two stiffeners pivotally connected to said mechanism, one of said stiffeners flexibly reinforcing each of said bellows.

2. The invention of claim 1 wherein:

said members are rigid;

said retainers are flexible and are quickly detachable from said members; and said bands are flexible, and cooperate with said retainers and said members in said resilient and slidable connection between said members and said retainers.

3. The invention of claims 1 or 2 wherein:

said support has a bushing slidably engaging a bushing aperture;

said mechanism includes a plate and a stud rigidly secured to said plate, said stud bearingly engaging said bushing to establish said main pivotal connection;

said bands and said bellows are pivotally connected to said mechanism at said secondary pivotal connections; and said stiffeners are V-shaped springs interposed in the primary pivotal connection between said support and said mechanism.

4. The invention of claims 1 or 2 wherein:

said enclosure includes a cowl rigidly secured to the other of said front and rear sections, said cowl being rigid and opaque, and cooperating with said bellows to enclose said articulation space.

5. The invention of claims 1 or 2, wherein:

said enclosure is substantially within said articulation space; and said support is rigidly secured to said front section juxtaposed said axis of articulation.

* * * * *